US012754530B2

(12) United States Patent
Maley

(10) Patent No.: US 12,754,530 B2
(45) Date of Patent: Oct. 6, 2026

(54) NUISANCE CONDITION DETECTION SYSTEM

(71) Applicant: Caterpillar Inc., Peoria, IL (US)

(72) Inventor: Jacob Maley, Germantown Hills, IL (US)

(73) Assignee: Caterpillar Inc., Peoria, IL (US)

( * ) Notice: Subject to any disclaimer, the term of this patent is extended or adjusted under 35 U.S.C. 154(b) by 460 days.

(21) Appl. No.: 18/363,174

(22) Filed: Aug. 1, 2023

(65) Prior Publication Data

US 2025/0044764 A1 Feb. 6, 2025

(51) Int. Cl.
*G06K 9/00* (2022.01)
*E02F 9/20* (2006.01)
(Continued)

(52) U.S. Cl.
CPC ........ *G05B 19/4065* (2013.01); *E02F 9/2033* (2013.01); *E02F 9/264* (2013.01);
(Continued)

(58) Field of Classification Search
CPC ........... E02F 9/2033; E02F 9/24; E02F 9/245; E02F 9/26; E02F 9/261; E02F 9/262; E02F 9/264; G06V 10/25; G06V 10/255; G06V 10/70; G06V 20/41; G06V 20/46; G06V 20/50; G06V 20/52; G06V 20/56; G06V 20/58; G06V 20/60; G06V 20/64; G06V 2201/06; G06V 2201/07; G06T 7/70; G06T 2207/30164; G06T 2207/30252; G06T 2207/30261; G05B 19/4061; G05B 19/4065; G05B 2219/31467; G05B 2219/49141; G05B 2219/49143;
(Continued)

(56) References Cited

U.S. PATENT DOCUMENTS

| | | | | |
|---|---|---|---|---|
| 10,160,383 | B2 * | 12/2018 | Onuma | G06V 20/58 |
| 11,421,402 | B2 * | 8/2022 | Ries | E02F 9/24 |

(Continued)

FOREIGN PATENT DOCUMENTS

| | | |
|---|---|---|
| EP | 3136341 | 3/2017 |

OTHER PUBLICATIONS

Written Opinion and International Search Report for Int'l. Patent Appln. No.PCT/US2024/038449, mailed Nov. 19, 2024 (12 pgs).

*Primary Examiner* — Eric Rush

(57) ABSTRACT

A nuisance condition detection system for a work machine includes an object detection sensor. The object detection sensor detects an object present in a field of view of the object detection sensor. The object detection sensor generates a first information pertaining to the object present in the field of view of the object detection sensor. The nuisance condition detection system also includes a controller. The controller includes one or more memories and one or more processors. The one or more processors receive the first information pertaining to the object from the object detection sensor. The one or more processors analyze the first information to determine if the object detected by the object detection sensor corresponds to a component of the work machine. The one or more processors prevent a generation of an alert if the object corresponds to the component of the work machine.

20 Claims, 7 Drawing Sheets

(51) Int. Cl.

| | |
|---|---|
| ***E02F 9/26*** | (2006.01) |
| ***G05B 19/4065*** | (2006.01) |
| ***G06T 7/70*** | (2017.01) |
| ***G06V 10/20*** | (2022.01) |
| ***G06V 10/25*** | (2022.01) |
| ***G06V 20/56*** | (2022.01) |
| ***G06V 20/58*** | (2022.01) |

(52) U.S. Cl.
CPC ................ *G06T 7/70* (2017.01); *G06V 10/25* (2022.01); *G06V 10/255* (2022.01); *G06V 20/56* (2022.01); *G06V 20/58* (2022.01); *G05B 2219/31467* (2013.01); *G06T 2207/30252* (2013.01)

(58) Field of Classification Search
CPC ........... G05B 2219/49153; G05B 2219/49157; B60Q 9/008; B60Q 2800/20; B60R 2300/8093
USPC ....... 382/100, 103, 106, 141, 152, 153, 181, 382/224, 227, 291, 325; 701/49, 50, 300, 701/301; 340/435, 436, 463, 471, 500, 340/506, 514, 540, 573.1, 673, 679, 680, 340/682, 684, 685, 686.1, 686.2, 686.6, 340/901, 903, 988; 348/61, 118, 120, 348/135, 143, 148, 161, 169; 37/347, 37/348
See application file for complete search history.

(56) References Cited

U.S. PATENT DOCUMENTS

| | | | | |
|---|---|---|---|---|
| 11,441,295 | B2 | 9/2022 | Plouffe | |
| 11,474,003 | B2 | 10/2022 | Grenzi et al. | |
| 11,512,450 | B2 | 11/2022 | Sulzer | |
| 11,572,116 | B2 | 2/2023 | Hoyt | |
| 11,898,331 | B2 * | 2/2024 | Maley | G06T 7/70 |
| 2017/0286763 | A1 * | 10/2017 | Fukuda | G06V 10/25 |
| 2018/0074178 | A1 * | 3/2018 | Cook | G01S 13/04 |
| 2019/0170879 | A1 | 6/2019 | Kinoshita et al. | |
| 2019/0279366 | A1 * | 9/2019 | Sick | G06V 20/56 |
| 2021/0027072 | A1 * | 1/2021 | Petrany | G06V 20/52 |
| 2021/0207339 | A1 | 7/2021 | Nakatani et al. | |
| 2021/0214923 | A1 | 7/2021 | Fujiwara et al. | |
| 2022/0057802 | A1 * | 2/2022 | Spielman, Jr. | G06V 20/58 |
| 2022/0396191 | A1 * | 12/2022 | Hebert | E02F 9/123 |
| 2023/0024622 | A1 | 1/2023 | Hoaby et al. | |

* cited by examiner

NUISANCE CONDITION DETECTION SYSTEM

TECHNICAL FIELD

The present disclosure relates to a nuisance condition detection system for a work machine and a nuisance condition detection method.

BACKGROUND

A work machine, such as an excavator, may include tracks for moving the work machine, one or more support structures, and/or work implements. Further, the work machine includes an operator station (or cabin) that allows an operator to control and observe ongoing work operations.

Typically, work machines are equipped with object detection systems that provide the operator with alerts related to a presence of various foreign objects around the work machine. The object detection system includes one or more sensors, such as cameras, that may be mounted at one or more sides of the work machine in order to detect the foreign objects. However, in some examples, such object detection systems may identify portions of the work machine, such as the tracks, the implement, or support structures, as foreign objects and may subsequently generate a false alert. Such a condition is particularly possible when an upper structure of the work machine rotates relative to a lower structure of the work machine. Further, the generation of such false alerts may create nuisance to the operator and may distract the operator, which may impact an efficiency and a productivity at a worksite.

U.S. Pat. No. 11,474,003 describes a monitoring system is disclosed for automatically estimating and monitoring the alignment of tracks of a track-type vehicle. The track-type vehicle includes an undercarriage and two tracks. Each track includes a chain with a plurality of chain links and articulated joints. The monitoring system includes at least one undercarriage sensor fixable on the undercarriage, at least one chain sensor fixable on the chain of each of the two tracks, and a processor configured to combine the detections of the sensors to determine the alignment direction of the tracks and to compare the determined direction with a reference alignment direction.

SUMMARY OF THE DISCLOSURE

In an aspect of the present disclosure, a nuisance condition detection system for a work machine is provided. The system includes an object detection sensor. The object detection sensor detects an object present in a field of view of the object detection sensor. The object detection sensor also generates a first information pertaining to the object present in the field of view of the object detection sensor. The system also includes a controller. The controller includes one or more memories and one or more processors. The one or more processors receive the first information pertaining to the object from the object detection sensor. The one or more processors also analyze the first information to determine if the object detected by the object detection sensor corresponds to a component of the work machine. The one or more processors further prevent a generation of an alert if the object corresponds to the component of the work machine.

In another aspect of the present disclosure, a nuisance condition detection method is provided. The nuisance condition detection method includes detecting, by an object detection sensor, an object present in a field of view of the object detection sensor. The nuisance condition detection method also includes generating, by the object detection sensor, a first information pertaining to the object present in the field of view of the object detection sensor. The nuisance condition detection method further includes, receiving by one or more processors of a controller, the first information pertaining to the object from the object detection sensor. The nuisance condition detection method includes analyzing, by the one or more processors, the first information to determine if the object detected by the object detection sensor corresponds to a component of the work machine. The nuisance condition detection method also includes preventing, by the one or more processors, a generation of an alert if the object corresponds to the component of the work machine.

Other features and aspects of this disclosure will be apparent from the following description and the accompanying drawings.

DETAILED DESCRIPTION

Wherever possible, the same reference numbers will be used throughout the drawings to refer to the same or like parts.

Figure 1:
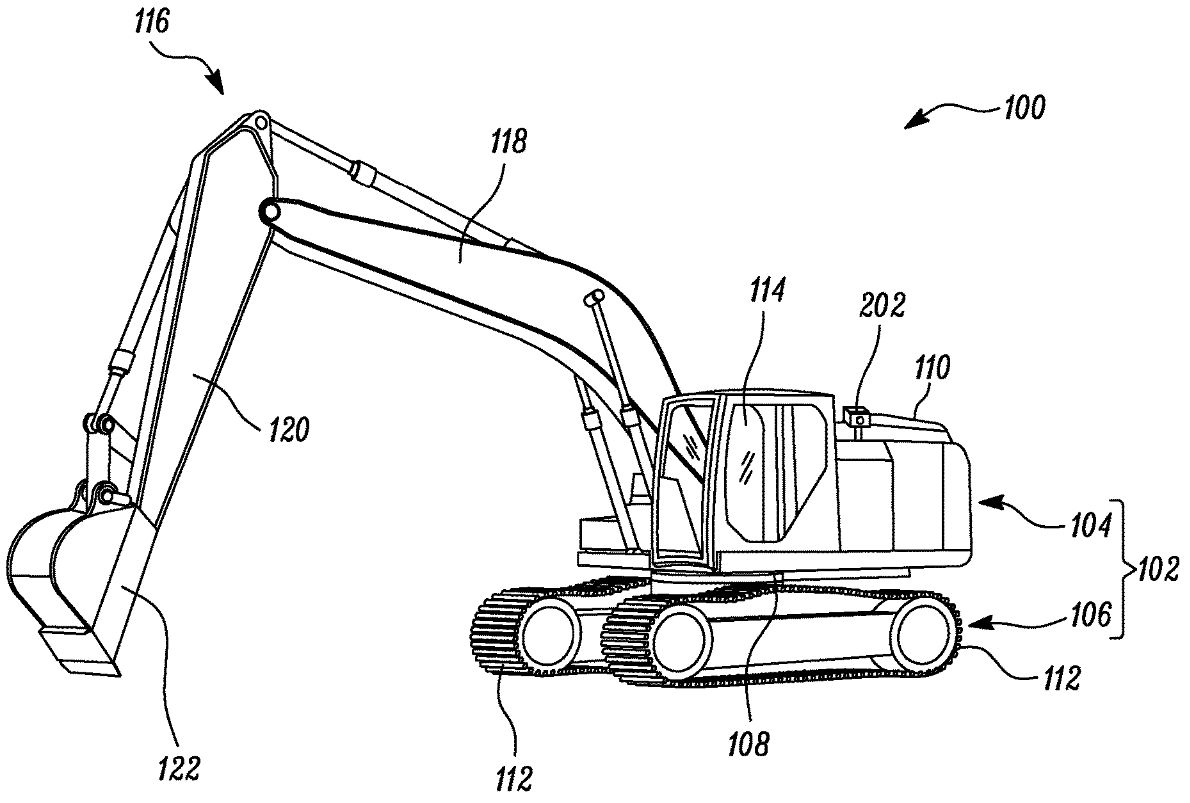
FIG. 1 is a schematic perspective view of a work machine, according to an example of the present disclosure.

Referring to FIG. 1, a perspective view of an exemplary work machine 100 is illustrated. The work machine 100 may perform one or more work operations associated with an industry, such as mining, construction, farming, transportation, or any other industry known in the art. The work machine 100 is embodied as a hydraulic excavator that may be used for purposes, such as digging, construction, landscaping, and the like. Alternatively, the work machine 100 may be embodied as a grader, a dozer, a loader, a scraper, a milling machine, a paving machine, a tractor, and a compactor, etc. that may be used in various industries to move, remove, or load materials, such as, asphalt, debris, dirt, snow, feed, gravel, logs, raw minerals, recycled material, rock, sand, woodchips, and the like.

The work machine 100 includes a body 102. The body 102 includes an upper structure 104 and a lower structure 106. The upper structure 104 is rotatably mounted on the lower structure 106 via a swing bearing portion 108 therebetween. The upper structure 104 includes a hood 110. The work machine 100 also includes a power source (not shown) disposed within the hood 110. The power source may include an engine, such as, an internal combustion engine, batteries, fuel cells, and the like. The power source may provide power to various components of the work machine 100 for operational and mobility requirements. The work machine 100 further includes a pair of tracks 112. The pair of tracks 112 are supported by the lower structure 106 and provide support and mobility to the work machine 100 on grounds. Alternatively, the work machine 100 may include wheels/drums instead of the tracks 112. The track(s) 112 may be hereinafter interchangeably referred to as "component 112".

The upper structure 104 further includes an operator cabin 114. The operator cabin 114 may include one or more controls (not shown) that may enable an operator to control the work machine 100. It should be noted that the operator of the work machine 100 may be seated within the operator cabin 114, or the operator may be present external to the work machine 100. Further, a display device 115 (shown in FIG. 4) may be disposed within the operator cabin 114. Alternatively, the display device 115 may be present at a back office, or any other location.

The work machine 100 includes a linkage assembly 116. The linkage assembly 116 is movably coupled to the upper structure 104. The linkage assembly 116 includes a boom 118 and an arm 120. The linkage assembly 116 also includes a work tool 122 pivotally coupled to the arm 120. The work tool 122 may be used to perform work operations, such as, loading, stock piling, dumping, digging and the like. The work tool 122 is embodied as a bucket herein. Alternatively, the work tool 122 may be any other type of work tool known in the art, such as, a blade.

In some examples, an object detection system (not shown) may be associated with the work machine 100 to identify presence of foreign objects around the work machine 100 and generate alert notifications to indicate the presence of such foreign objects around the work machine 100. In some cases, the object detection system may identify a portion of the work machine 100 as a foreign object and may subsequently generate the alert notification to notify the operator regarding the foreign object. Such alerts may be irrelevant to the operator and may present a nuisance condition to the operator. Thus, the present disclosure is directed towards identification of such nuisance conditions, and filter-out any alert notifications indicative of such nuisance conditions.

Figure 2:
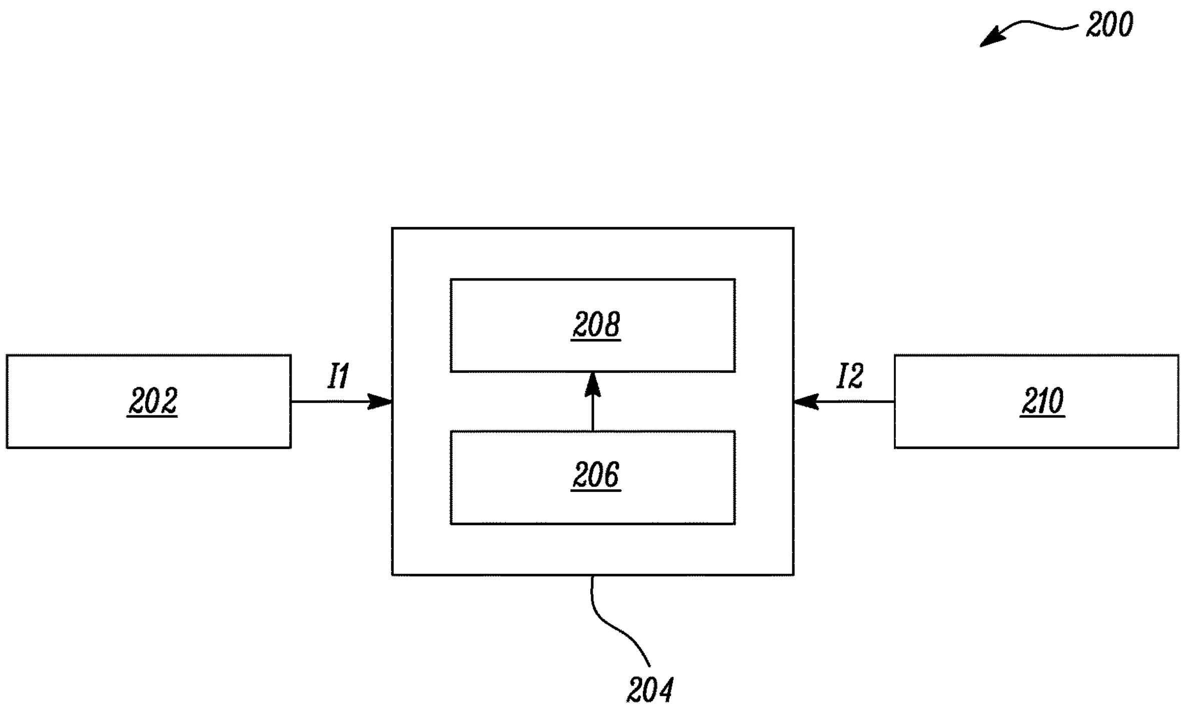
FIG. 2 is a block diagram of a nuisance condition detection system for the work machine of FIG. 1, according to an example of the present disclosure.

Referring to FIG. 2, a block diagram of a nuisance condition detection system 200 for the work machine 100 is illustrated. The nuisance condition detection system 200 includes an object detection sensor 202. In some examples, the object detection sensor 202 may include a camera-based sensor, a light detection and ranging (LIDAR) sensor, a radio detection and ranging (RADAR) sensor, or an ultrasonic sensor, without any limitations.

The camera-based sensor may include a monocular or a stereoscopic digital camera, a high-resolution digital camera, or any suitable digital camera. Further, the camera-based sensor may include any one of a still camera, a camcorder, a video camera, a closed-circuit television (CCTV) camera, and the like, without any limitations. The camera-based sensor may include one or more optical flow chips and/or other components that facilitate acquisition of images. In some examples, the camera-based sensor may embody a complimentary metal-oxide semiconductor (CMOS) camera. It should be noted that the camera-based sensor may include any other type of imaging device known in the art.

It should be noted that the object detection sensor 202 may be mounted at a location on the work machine 100 that allows the object detection sensor 202 to capture clear visual data of a vicinity of the work machine 100. The object detection sensor 202 may be mounted on each side of the work machine 100. Further, multiple object detection sensor 202 may be mounted at different locations on the work machine 100. The object detection sensor 202 is mounted atop the hood 110 (see FIG. 1) of the work machine 100. Alternatively, the object detection sensor 202 may be mounted at a rear end of the work machine 100 or at a front end of the work machine 100, without limiting the scope of the present disclosure.

Figure 3A:
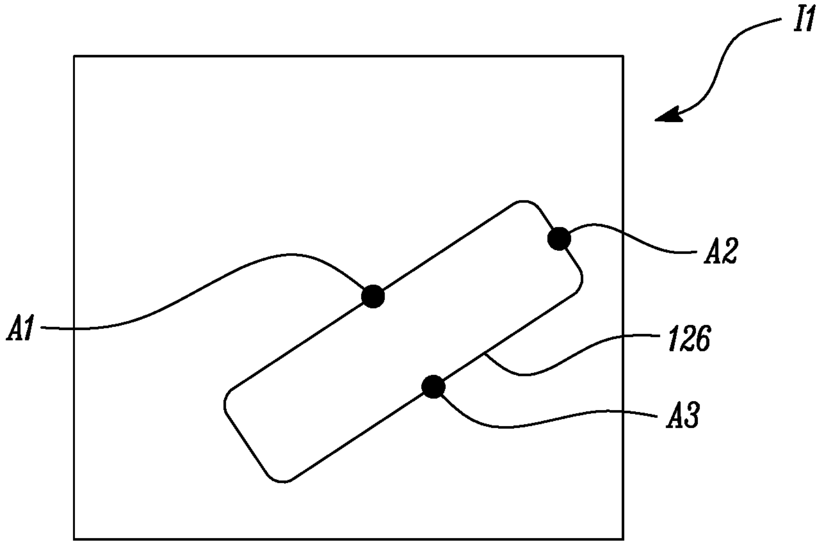
FIGS. 3A and 3B are exemplary illustrations that depict a technique of determining a nuisance condition, according to an example of the present disclosure.

The object detection sensor 202 detects an object 126 (shown in FIGS. 3A and 4) present in a field of view of the object detection sensor 202. For exemplary purposes, the object 126 present in the field of view of the object detection sensor 202 includes the track 112 of the work machine 100 herein. Alternatively, the object 126 may be any other component of the work machine 100, or a foreign object that is external to the work machine 100. The object detection sensor 202 also generates a first information I1 pertaining to the object 126 present in the field of view of the object detection sensor 202. In one example, the first information I1 includes a number of pixel co-ordinates A1, A2, A3 . . . , An (three of the pixel co-ordinates A1, A2, A3 are shown in FIG. 3A) of the object 126. It should be noted that each pixel co-ordinate A1, A2, A3 . . . , An may include a corresponding X co-ordinate and a corresponding Y co-ordinate for the object 126. In some examples, the number of pixel co-ordinates A1, A2, A3 may provide an outline of the object 126.

The nuisance condition detection system 200 also includes a controller 204. In an application, the controller 204 may be a control circuit, a computer, a microprocessor, a microcomputer, a central processing unit, or any suitable device or apparatus. The controller 204 includes one or more memories 206 and one or more processors 208. The one or more processors 208 are communicably coupled with the one or more memories 206. Further, the one or more processors 208 are also communicably coupled with the object detection sensor 202.

Figure 3B:
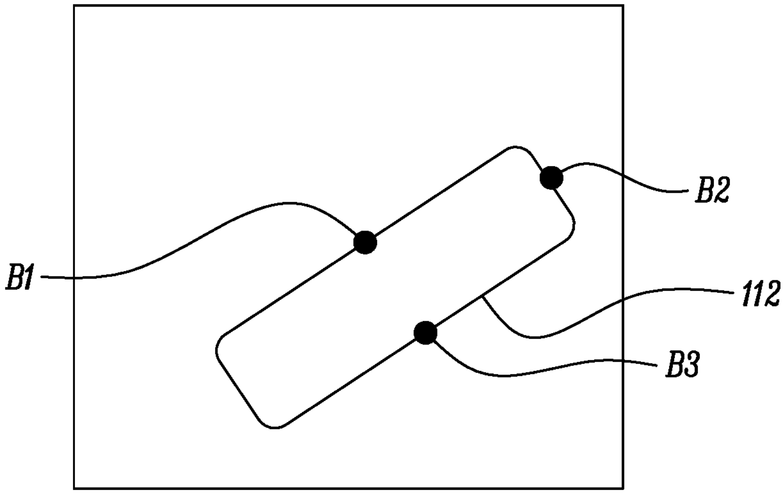

The one or more memories 206 may store a number of predetermined pixel co-ordinates B1, B2, B3 . . . , Bn (three of the pixel co-ordinates B1, B2, B3 are shown in FIG. 3B) of the component 112 at different positions of the component 112 as per an angle of the upper structure 104 relative to the lower structure 106. It should be noted that each predetermined pixel co-ordinate B1, B2, B3 . . . , Bn may include a corresponding X co-ordinate and a corresponding Y co-ordinate of the component 112. In some examples, the number of pixel co-ordinates B1, B2, B3 may provide an outline of the component 112.

It should be noted that the predetermined pixel co-ordinate B1, B2, B3 may vary as per the angle of the upper structure 104 (see FIG. 1) relative to the lower structure 106 (see FIG. 1). Thus, the predetermined pixel co-ordinates B1, B2, B3 of the component 112 when the angle is about 25 degrees will be different from the predetermined pixel co-ordinates B1, B2, B3 of the component 112 when the angle is about 75 degrees. Accordingly, the memories 206 may store a table containing the predetermined pixel co-ordinates B1, B2, B3 of the component 112 at various angles of the upper structure 104 relative to the lower structure 106.

The one or more memories 206 may also store a number of predetermined ranges and a number of predetermined bearing angles of the component 112 at different positions of the component 112 as per the angle of the upper structure 104 relative to the lower structure 106. It should be noted that the predetermined ranges and the predetermined bearing angles may vary as per the angle of the upper structure 104 relative to the lower structure 106. Thus, the predetermined ranges and the predetermined bearing angles of the component 112 when the angle is about 25 degrees will be different from the predetermined ranges and the predetermined bearing angles of the component 112 when the angle is about 75 degrees. Accordingly, the memories 206 may store a table containing the predetermined ranges and the predetermined bearing angles of the component 112 at various angles of the upper structure 104 relative to the lower structure 106.

In some examples, the memories 206 may include a random access memory (RAM) such as synchronous dynamic random access memory (SDRAM), a read-only memory (ROM), a non-volatile random access memory (NVRAM), an electrically erasable programmable read-only memory (EEPROM), a FLASH memory, a magnetic or optical data storage media, and the like, that can be used to store various information or desired program codes in the form of instructions or data structures and that can be accessed by processors 208.

Further, the processors 208 may execute various types of digitally stored instructions, such as, software applications or algorithms, retrieved from the memories 206, or a firmware program which may enable the processors 208 to perform a wide variety of operations. It should be noted that the processors 208 may embody a single microprocessor or multiple microprocessors for receiving various input signals and generating output signals. Numerous commercially available microprocessors may perform the functions of the processors 208. Each processor 208 may further include a general processor, a central processing unit, an application specific integrated circuit (ASIC), a digital signal processor, a field programmable gate array (FPGA), a digital circuit, an analog circuit, a microcontroller, any other type of processor, or any combination thereof. Each processor 208 may include one or more components that may be operable to execute computer executable instructions or computer code that may be stored and retrieved from the memories 206.

Further, the one or more processors 208 receive the first information I1 pertaining to the object 126 from the object detection sensor 202. The one or more processors 208 analyze the first information I1 to determine if the object 126 detected by the object detection sensor 202 corresponds to the component 112 of the work machine 100.

Moreover, the one or more processors 208 prevent a generation of an alert if the object 126 corresponds to the component 112 of the work machine 100. In other words, the one or more processors 208 filter out any alerts if the object 126 corresponds to the component 112 of the work machine 100. Although the component 112 includes the single track 112 of the work machine 100 herein. In other examples, the component 112 may include both the tracks 112, an implement 512 (see FIG. 5), a support structure 612 (see FIG. 6) associated with the work machine 100, and the like.

It should be noted that, if the object 126 detected by the object detection sensor 202 does not correspond to the component 112 of the work machine 100, the one or more processors 208 may generate an alert notification to notify the operator regarding the object 126.

Various techniques of determining if the object 126 detected by the object detection sensor 202 corresponds to the component 112 of the work machine 100 will now be explained in detail. As shown in FIG. 2, the nuisance condition detection system 200 includes a position sensor 210. In an example, the position sensor 210 may include a swing angle position sensor. The position sensor 210 generates a second information I2 associated with a current position of the component 112 of the work machine 100. Specifically, the second information I2 includes a position of the upper structure 104 of the work machine 100 relative to the lower structure 106 of the work machine 100, that may be used to estimate the current position of the component 112. For example, the second information I2 provides a value of the angle of the upper structure 104 relative to the lower structure 106. Further, the component 112 is coupled to the lower structure 106 of the work machine 100.

The one or more processors 208 also determine the current position of the component 112 of the work machine 100 based on the second information I2 from the position sensor 210. Specifically, the processors 208 receive the second information I2 corresponding to the angle of the upper structure 104 relative to the lower structure 106.

FIG. 3A illustrates an exemplary representation of the first information I1 i.e., the number of pixel co-ordinates A1, A2, A3 received from the object detection sensor 202 (see FIG. 2). FIG. 3B illustrates an exemplary representation of the number of predetermined pixel co-ordinates B1, B2, B3 retrieved based on the second information I2 i.e., the angle of the upper structure 104 (see FIG. 1) relative to the lower structure 106 (see FIG. 1).

With reference to FIGS. 2, 3A, and 3B, the one or more processors 208 compare the number of pixel co-ordinates A1, A2, A3 of the object 126 with the number of predetermined pixel co-ordinates B1, B2, B3 of the component 112 at the current position of the component 112 to determine if the number of pixel co-ordinates A1, A2, A3 of the object 126 overlap with the number of predetermined pixel co-ordinates B1, B2, B3 of the component 112 at the current position of the component 112. It should be noted that the processors 208 may retrieve the number of predetermined pixel co-ordinates B1, B2, B3 of the component 112 at the angle detected by the positions sensor 210 to compare the number of pixel co-ordinates A1, A2, A3 of the object 126 with the number of predetermined pixel co-ordinates B1, B2, B3 of the component 112.

Further, the one or more processors 208 determine that the object 126 detected by the object detection sensor 202 corresponds to the component 112 of the work machine 100 if the number of pixel co-ordinates A1, A2, A3 of the object 126 overlap with the number of predetermined pixel co-ordinates B1, B2, B3 of the component 112 at the current position of the component 112.

Thus, if the one or more processors 208 determine that the object 126 detected by the object detection sensor 202 corresponds to the component 112 of the work machine 100, the processors 208 prevent the generation of the alert.

Referring again to FIG. 2, in another example, the first information I1 may include a range and a bearing angle of the object 126. The one or more processors 208 compare the range and the bearing angle of the object 126 with the predetermined range and the predetermined bearing angle of the component 112 at the current position of the component 112 to determine if the range and the bearing angle of the object 126 overlap with the predetermined range and the predetermined bearing angle of the component 112 at the current position of the component 112. It should be noted that the processors 208 may retrieve the predetermined range and the predetermined bearing angle of the component 112 at the angle detected by the positions sensor 210 to compare the range and the bearing angle of the object 126 with the predetermined range and the predetermined bearing angle of the component 112.

Further, the one or more processors 208 determine that the object 126 detected by the object detection sensor 202 corresponds to the component 112 of the work machine 100 if the range and the bearing angle of the object 126 overlap with the predetermined range and the predetermined bearing angle of the component 112 at the current position of the component 112.

Thus, if the one or more processors 208 determine that the object 126 detected by the object detection sensor 202 corresponds to the component 112 of the work machine 100, the processors 208 prevent the generation of the alert.

Figure 4:
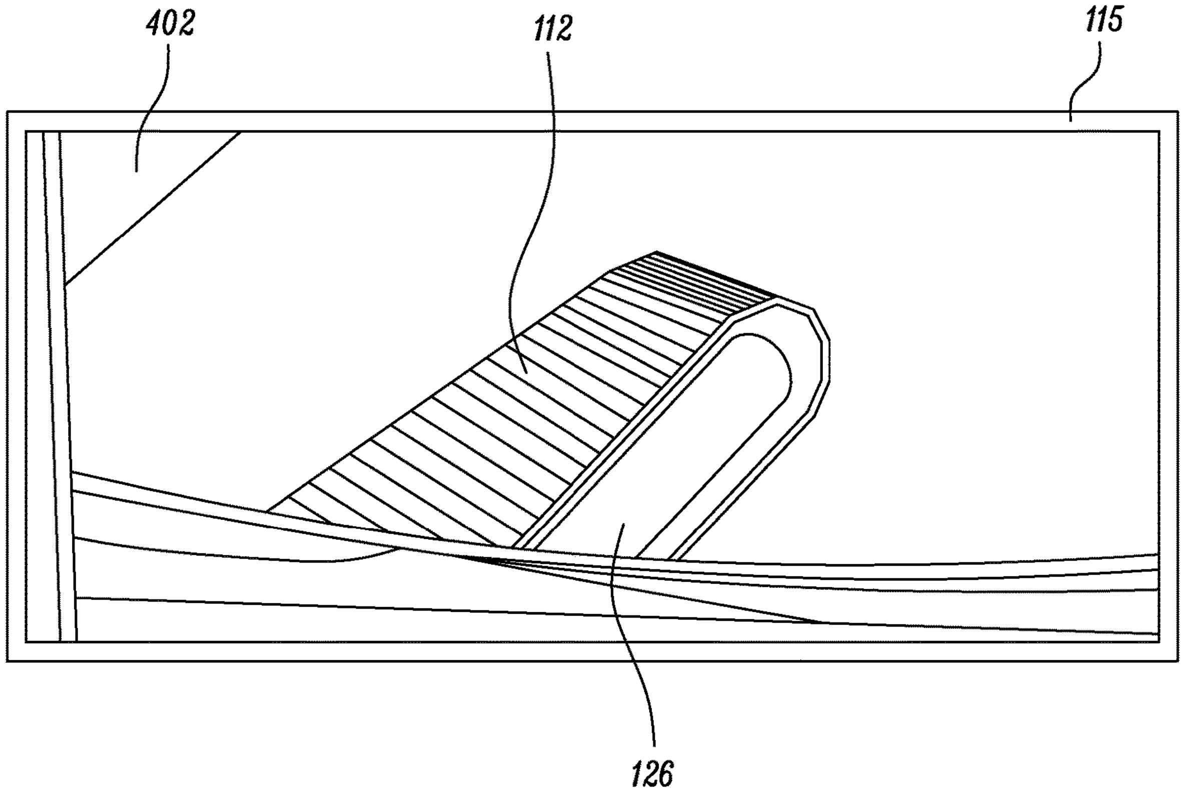
FIG. 4 illustrates an exemplary image of a surrounding area of the work machine of FIG. 1 as generated by an object detection sensor of the nuisance condition detection system of FIG. 2, according to an example of the present disclosure.

FIG. 4 illustrates an exemplary image 402 of a surrounding area of the work machine 100 as generated by the object detection sensor 202 and displayed on the display device 115 associated with the work machine 100 of FIG. 1. Referring to FIGS. 2 and 4, in yet another example, the first information I1 includes the image 402 of the vicinity of the work machine 100. The image 402 is captured by the object detection sensor 202. Further, the image 402 is received by the processors 208. In such an example, the one or more processors 208 analyze the image 402 to determine if the object 126 detected by the object detection sensor 202 corresponds to the component 112 of the work machine 100. The object 126 is embodied as the track 112 of the work machine 100 in the image 402. Alternatively, the object 126 may include any other portion of the work machine 100. In some examples, the one or more processors 208 may utilize one or more machine learning techniques to determine if the object 126 in the image 402 includes the component 112. In an example, the processors 208 may apply object recognition techniques to determine if the object 126 in the image 402 includes the component 112. Further, if the one or more processors 208 determine that the object 126 detected by the object detection sensor 202 corresponds to the component 112 of the work machine 100, based on the analysis of the image 402, the processors 208 prevent the generation of the alert.

Figure 5:
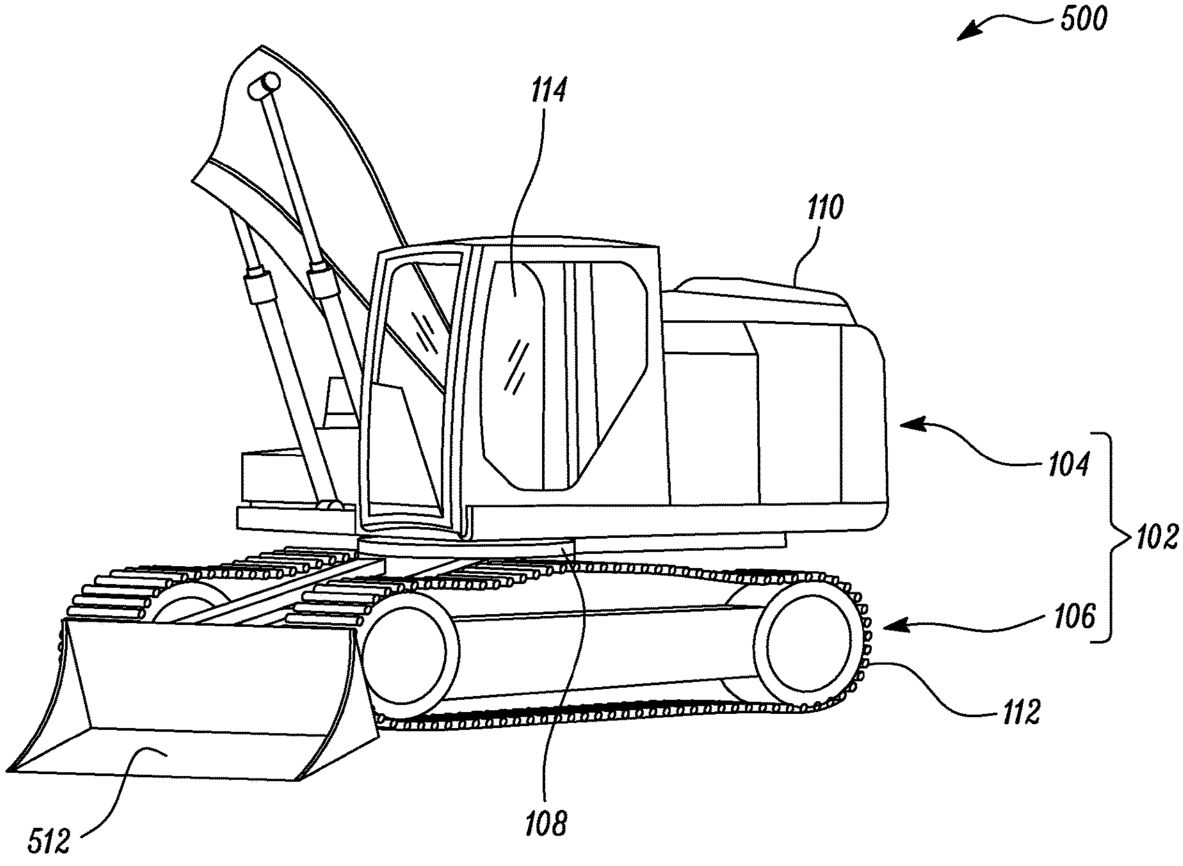
FIG. 5 is a schematic perspective view of a work machine, according to another example of the present disclosure.

FIG. 5 illustrates a schematic perspective view of a work machine 500. The work machine 500 is embodied as a track-type excavator herein. The work machine 500 may be substantially similar to the work machine 100, with common components referred to by the same numerals. Further, the work machine 500 includes a component 512. Particularly, the component 512 includes (and may be hereinafter interchangeably referred to as) the implement 512 of the work machine 500. The implement 512 as illustrated in FIG. 5 includes a moldboard.

Further, the nuisance condition detection system 200 as explained in relation to FIGS. 2 to 4 may also be used to determine if the object 126 detected by the object detection sensor 202 corresponds to the component 512. Furthermore, the nuisance condition detection system 200 may apply similar techniques as described in relation to FIGS. 2 to 4 to determine if the object 126 detected by the object detection sensor 202 corresponds to the component 512.

Figure 6:
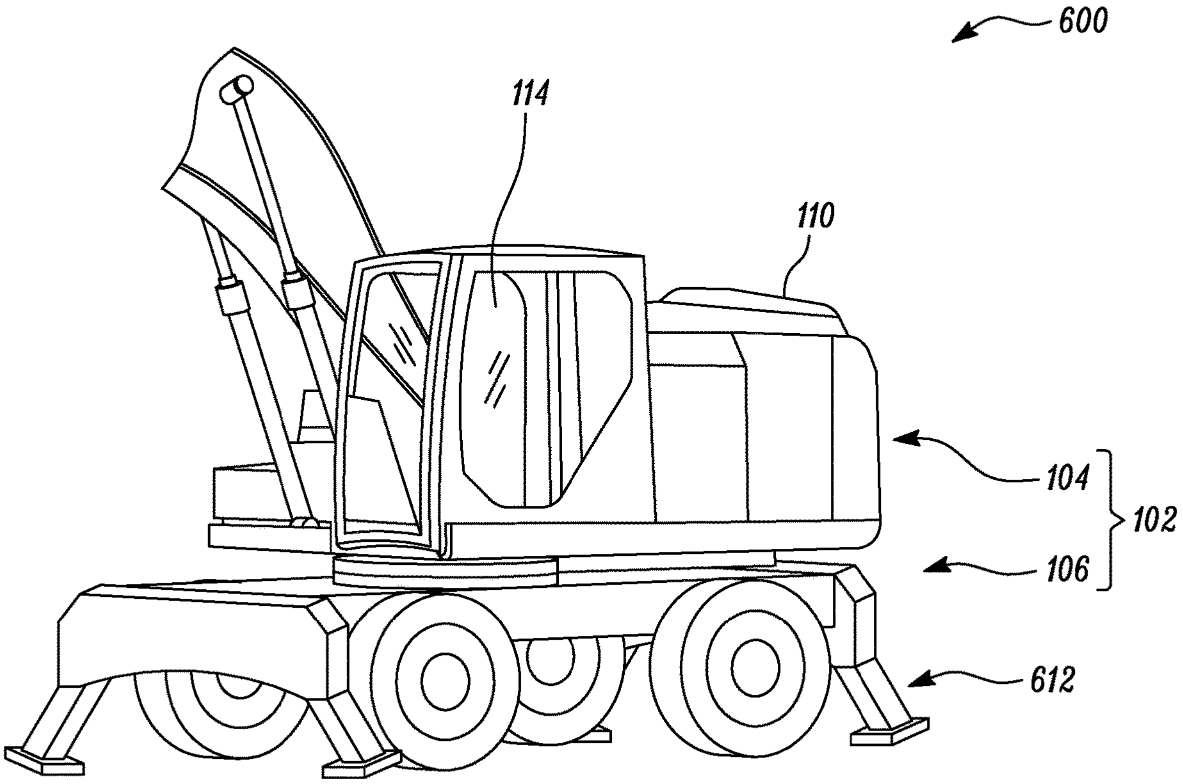
FIG. 6 is a schematic perspective view of a work machine, according to another example of the present disclosure.

FIG. 6 illustrates a schematic perspective view of a work machine 600. The work machine 600 is embodied as a wheeled excavator herein. The work machine 600 may be substantially similar to the work machine 100, with common components referred to by the same numerals. Further, the work machine 600 includes a component 612. Particularly, the component 612 includes (and may be hereinafter interchangeably referred to as) the support structure 612 of the work machine 600. Specifically, the support structure 612 includes a number of stabilizer arms connected to the lower structure 106 of the work machine 600.

Further, the nuisance condition detection system 200 as explained in relation to FIGS. 2 to 4 may also be used to determine if the object 126 detected by the object detection sensor 202 corresponds to the component 612. Furthermore, the nuisance condition detection system 200 may apply similar techniques as described in relation to FIGS. 2 to 4 to determine if the object 126 detected by the object detection sensor 202 corresponds to the component 612.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

The nuisance condition detection system 200 of the present disclosure determines if the object 126 present in the field of view of the object detection sensor 202 corresponds to the component 112, 512, 612 of the work machine 100, 500, 600, respectively to prevent generation of any false alerts for the operator. Particularly, the nuisance condition detection system 200 may use various techniques (such as, analysis of the pixel co-ordinates A1, A2, A3 of the object 126, analysis of the range and bearing angles of the object 126, and/or analysis of the image 402) to determine if the object 126 detected by the object detection sensor 202 corresponds to the component 112, 512, 612 of the work machine 100, 500, 600. Further, the nuisance condition detection system 200 described herein may be cost-effective to incorporate on work machines and may be retrofitted on existing work machines. Moreover, the nuisance condition detection system 200 may allow the operator to perform work operations in an efficient manner without unnecessary distractions.

It should be noted that the system 200 described herein may work in conjunction with known object detection systems to suppress nuisance alerts. Alternatively, the controller 204 of the system 200 may be designed to detect objects, generate alerts if the detected objects do not include a portion of the work machine 100, 500, 600, and further suppress any alerts if the detected objects include a portion of the work machine 100, 500, 600.

Figure 7:
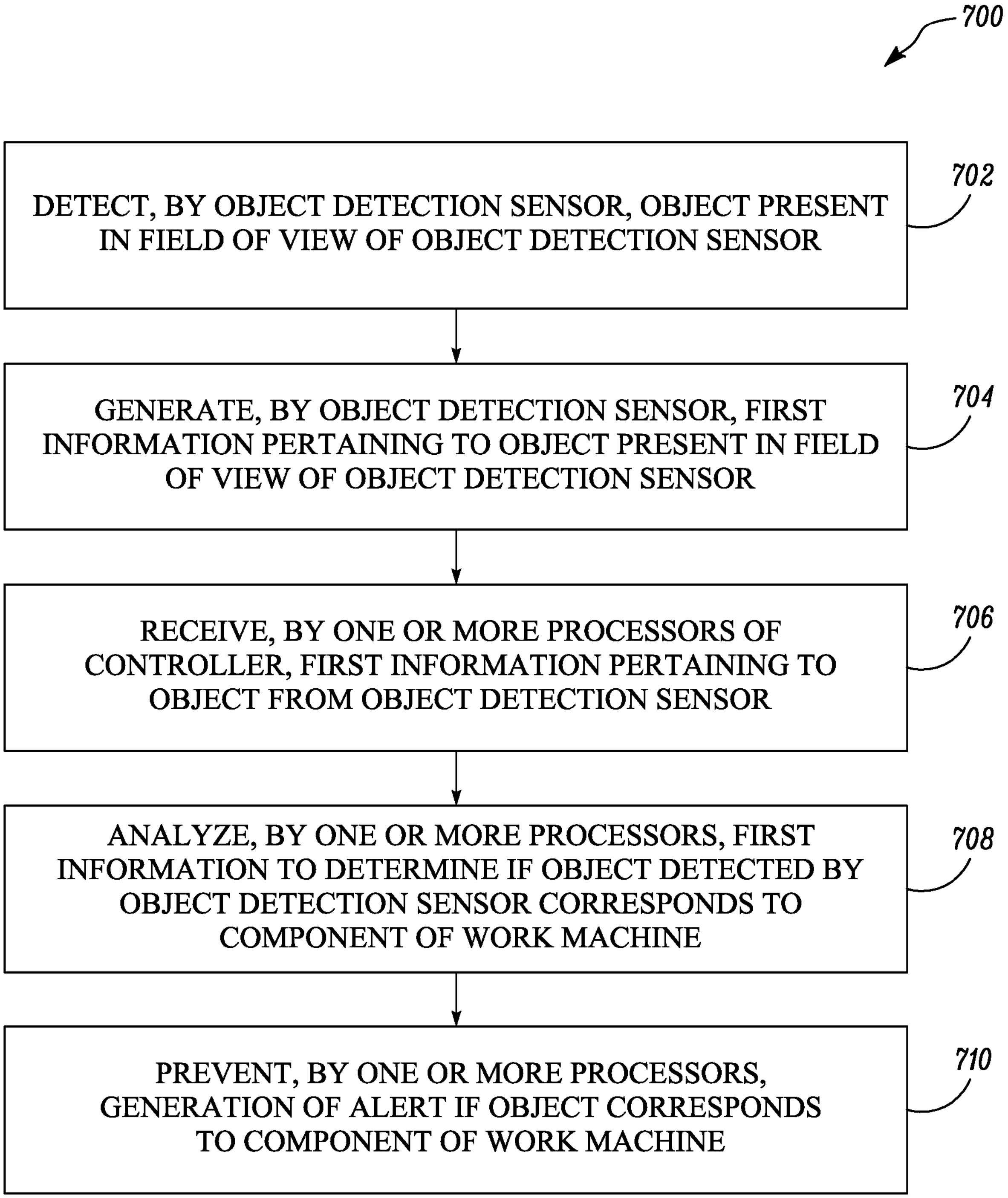
FIG. 7 is a flowchart for a nuisance condition detection method, according to an example of the present disclosure.

Referring to FIG. 7, a flowchart for a nuisance condition detection method 700 is illustrated. The nuisance condition detection method 700 will be explained in relation to the work machine 100 and the component 112 of the work machine 100. However, the nuisance condition detection method 700 is equally applicable to the work machine 500, 600 and the component 512, 612, respectively.

At step 702, the object detection sensor 202 detects the object 126 present in the field of view of the object detection sensor 202.

At step 704, the object detection sensor 202 generates the first information I1 pertaining to the object 126 present in the field of view of the object detection sensor 202.

At step 706, the one or more processors 208 of the controller 204 receive the first information I1 pertaining to the object 126 from the object detection sensor 202.

At step 708, the one or more processors 208 analyze the first information I1 to determine if the object 126 detected by the object detection sensor 202 corresponds to the component 112 of the work machine 100, 500, 600, respectively. It should be noted that the component 112, 512, 612 may include the track 112 of the work machine 100, the implement 512 of the work machine 500, and/or the support structure 612 associated with the work machine 600.

At step 710, the one or more processors 208 prevent the generation of the alert if the object 126 corresponds to the component 112 of the work machine 100, 500, 600.

Further, the nuisance condition detection method 700 also includes a step at which the position sensor 210 generates the second information I2 associated with the current position of the component 112 of the work machine 100, 500, 600. Furthermore, the nuisance condition detection method 700 also includes a step at which the one or more processors 208 determine the current position of the component 112 of the work machine 100, 500, 600 based on the second information I2 from the position sensor 210.

In an example, the first information I1 includes the number of pixel co-ordinates A1, A2, A3 of the object 126. The one or more memories 206 of the controller 204 store the number of predetermined pixel co-ordinates B1, B2, B3 of the component 112 at different positions of the component 112. The nuisance condition detection method 700 further includes a step at which the one or more processors 208 compare the number of pixel co-ordinates A1, A2, A3 of the object 126 with the number of predetermined pixel co-ordinates B1, B2, B3 of the component 112 at the current position of the component 112 to determine if the number of pixel co-ordinates A1, A2, A3 of the object 126 overlap with the number of predetermined pixel co-ordinates B1, B2, B3 of the component 112 at the current position of the component 112. The nuisance condition detection method 700 further includes a step at which the one or more processors 208 determine that the object 126 detected by the object detection sensor 202 corresponds to the component 112 of the work machine 100, 500, 600 if the number of pixel co-ordinates A1, A2, A3 of the object 126 overlap with the number of predetermined pixel co-ordinates B1, B2, B3 of the component 112 at the current position of the component 112.

In another example, the first information I1 includes the range and the bearing angle of the object 126. The one or more memories 206 of the controller 204 store the number of predetermined ranges and the number of predetermined bearing angles of the component at different positions of the component 112. The nuisance condition detection method 700 further includes a step at which the one or more processors 208 compare the range and the bearing angle of the object 126 with the predetermined range and the predetermined bearing angle of the component 112 at the current position of the component 112 to determine if the range and the bearing angle of the object 126 overlap with the predetermined range and the predetermined bearing angle of the component 112 at the current position of the component 112. The nuisance condition detection method 700 further includes a step at which the one or more processors 208 determine that the object 126 detected by the object detection sensor 202 corresponds to the component 112 of the work machine 100, 500, 600 if the range and the bearing angle of the object 126 overlap with the predetermined range and the predetermined bearing angle of the component 112 at the current position of the component 112.

In yet another example, the first information I1 includes the image 402 of the vicinity of the work machine 100, 500, 600. Further, the nuisance condition detection method 700 includes a step at which the one or more processors 208 analyze the image 402 to determine if the object 126 detected by the object detection sensor 202 corresponds to the component 112 of the work machine 100, 500, 600.

While aspects of the present disclosure have been particularly shown and described with reference to the embodiments above, it will be understood by those skilled in the art that various additional embodiments may be contemplated by the modification of the disclosed work machine, systems and methods without departing from the spirit and scope of the disclosure. Such embodiments should be understood to fall within the scope of the present disclosure as determined based upon the claims and any equivalents thereof.

What is claimed is:

1. A nuisance condition detection system for a work machine, the nuisance condition detection system comprising:

an object detection sensor configured to:
- detect an object present in a field of view of the object detection sensor; and
- generate a first information pertaining to the object present in the field of view of the object detection sensor; and a controller including one or more memories and one or more processors, wherein the one or more processors are configured to:
- receive the first information pertaining to the object from the object detection sensor;
- analyze the first information to determine if the object detected by the object detection sensor corresponds to a component of the work machine;
- prevent a generation of an alert if the object corresponds to the component of the work machine; and
- receive second information associated with a current position of the component of the work machine;

wherein the one or more processors are further configured to determine the current position of the component of the work machine based on the second information;

wherein the first information includes a plurality of pixel co-ordinates of the object;

wherein the one or more memories are configured to store a plurality of predetermined pixel co-ordinates of the component at different positions of the component, wherein the different positions of the component include the current position of the component, and wherein the one or more processors are further configured to:
- compare the plurality of pixel co-ordinates of the object with the plurality of predetermined pixel co-ordinates of the component at the current position of the component to determine if the plurality of pixel co-ordinates of the object overlap with the plurality of predetermined pixel co- ordinates of the component at the current position of the component; and
- determine that the object detected by the object detection sensor corresponds to the component of the work machine if the plurality of pixel co-ordinates of the object overlap with the plurality of predetermined pixel co-ordinates of the component at the current position of the component.

2. The nuisance condition detection system of claim 1, further comprising a position sensor configured to generate the second information associated with the current position of the component of the work machine.

3. The nuisance condition detection system of claim 1, wherein the first information includes an image of a vicinity of the work machine, and wherein the one or more processors are configured to analyze the image based at least in part on the determined current position of the component of the work machine to determine if the object detected by the object detection sensor corresponds to the component of the work machine.

4. The nuisance condition detection system of claim 1, wherein the second information includes a position of an upper structure of the work machine relative to a lower structure of the work machine, and wherein the component is coupled to the lower structure of the work machine.

5. The nuisance condition detection system of claim 1, wherein the component includes at least one of a track of the work machine, an implement of the work machine, and a support structure associated with the work machine.

6. The nuisance condition detection system of claim 1, wherein the object detection sensor includes at least one of a camera-based sensor, a light detection and ranging (LIDAR) sensor, and a radio detection and ranging (RADAR) sensor.

7. A nuisance condition detection system for a work machine. the nuisance condition detection system comprising:

an object detection sensor configured to:
- detect an object present in a field of view of the object detection sensor; and
- generate a first information pertaining to the object present in the field of view of the object detection sensor; and a controller including one or more memories and one or more processors, wherein the one or more processors are configured to:
- receive the first information pertaining to the object from the object detection sensor;
- analyze the first information to determine if the object detected by the object detection sensor corresponds to a component of the work machine;
- prevent a generation of an alert if the object corresponds to the component of the work machine; and
- receive a second information associated with a current position of the component of the work machine;

wherein the one or more processors are further configured to determine the current position of the component of the work machine based on the second information;

wherein the first information includes a range and a bearing angle of the object; and wherein the one or more memories are configured to store a plurality of predetermined ranges and a plurality of predetermined bearing angles of the component at different positions of the component, wherein the different positions of the component include the current position of the component, and wherein the one or more processors are further configured to:

compare the range and the bearing angle of the object with the predetermined range and the predetermined bearing angle of the component at the current position of the component to determine if the range and the bearing angle of the object overlap with the predetermined range and the predetermined bearing angle of the component at the current position of the component; and determine that the object detected by the object detection sensor corresponds to the component of the work machine if the range and the bearing angle of the object overlap with the predetermined range and the predetermined bearing angle of the component at the current position of the component.

8. The nuisance condition detection system of claim 7, further comprising a position sensor configured to generate the second information associated with the current position of the component of the work machine.

9. The nuisance condition detection system of claim 7, wherein the first information includes an image of a vicinity of the work machine, and wherein the one or more processors are configured to analyze the image to determine if the object detected by the object detection sensor corresponds to the component of the work machine.

10. The nuisance condition detection system of claim 7, wherein the second information includes a position of an upper structure of the work machine relative to a lower structure of the work machine, and wherein the component is coupled to the lower structure of the work machine.

11. The nuisance condition detection system of claim 7, wherein the component includes at least one of a track of the work machine, an implement of the work machine, and a support structure associated with the work machine.

12. The nuisance condition detection system of claim 7, wherein the object detection sensor includes at least one of a light detection and ranging (LIDAR) sensor, a radio detection and ranging (RADAR) sensor, and an ultrasonic sensor.

13. A nuisance condition detection method for a work machine, the method comprising:

- detecting, by an object detection sensor, an object present in a field of view of the object detection sensor;
- generating, by the object detection sensor, a first information pertaining to the object present in the field of view of the object detection sensor;
- receiving, by one or more processors of a controller, the first information pertaining to the object from the object detection sensor;
- analyzing, by the one or more processors, the first information to determine if the object detected by the object detection sensor corresponds to a component of the work machine; and
- preventing, by the one or more processors, a generation of an alert if the object corresponds to the component of the work machine;
- further comprising receiving second information associated with a current position of the component of the work machine;
- further comprising determining, by the one or more processors, the current position of the component of the work machine based on the second information;
- wherein the first information includes a plurality of pixel co-ordinates of the object; and
- wherein one or more memories of the controller are configured to store a plurality of predetermined pixel co-ordinates of the component at different positions of the component, wherein the different positions of the component include the current position of the component, and wherein the nuisance condition detection method further comprises:
- comparing, by the one or more processors, the plurality of pixel co-ordinates of the object with the plurality of predetermined pixel co-ordinates of the component at the current position of the component to determine if the plurality of pixel co-ordinates of the object overlap with the plurality of predetermined pixel co-ordinates of the component at the current position of the component; and
- determining, by the one or more processors, that the object detected by the object detection sensor corresponds to the component of the work machine if the plurality of pixel co-ordinates of the object overlap with the plurality of predetermined pixel co-ordinates of the component at the current position of the component.

14. The nuisance condition detection method of claim 13, further comprising generating, by a position sensor, the second information associated with the current position of the component of the work machine.

15. The nuisance condition detection method of claim 13, wherein the first information includes an image of a vicinity of the work machine, and wherein the nuisance condition detection method further comprises analyzing, by the one or more processors, the image based at least in part on the determined current position of the component of the work machine to determine if the object detected by the object detection sensor corresponds to the component of the work machine.

16. The nuisance condition detection method of claim 13, wherein the component includes at least one of a track of the work machine, an implement of the work machine, and a support structure associated with the work machine.

17. A nuisance condition detection method for a work machine, the method comprising:

detecting, by an object detection sensor, an object present in a field of view of the object detection sensor;

generating, by the object detection sensor, a first information pertaining to the object present in the field of view of the object detection sensor;

receiving, by one or more processors of a controller, the first information pertaining to the object from the object detection sensor;

analyzing, by the one or more processors, the first information to determine if the object detected by the object detection sensor corresponds to a component of the work machine; and preventing, by the one or more processors, a generation of an alert if the object corresponds to the component of the work machine;

further comprising receiving second information associated with a current position of the component of the work machine;

further comprising determining, by the one or more processors, the current position of the component of the work machine based on the second information;

wherein the first information includes a range and a bearing angle of the object:

wherein one or more memories of the controller are configured to store a plurality of predetermined ranges and a plurality of predetermined bearing angles of the component at different positions of the component, wherein the different positions of the component include the current position of the component, and wherein the nuisance condition detection method further comprises:

comparing, by the one or more processors, the range and the bearing angle of the object with the predetermined range and the predetermined bearing angle of the component at the current position of the component to determine if the range and the bearing angle of the object overlap with the predetermined range and the predetermined bearing angle of the component at the current position of the component; and determining, by the one or more processors, that the object detected by the object detection sensor corresponds to the component of the work machine if the range and the bearing angle of the object overlap with the predetermined range and the predetermined bearing angle of the component at the current position of the component.

18. The nuisance condition detection method of claim 17, further comprising generating, by a position sensor, the second information associated with the current position of the component of the work machine.

19. The nuisance condition detection method of claim 17, wherein the first information includes an image of a vicinity of the work machine, and wherein the nuisance condition detection method further comprises analyzing, by the one or more processors, the image based at least in part on the determined current position of the component of the work machine to determine if the object detected by the object detection sensor corresponds to the component of the work machine.

20. The nuisance condition detection method of claim 17, wherein the component includes at least one of a track of the work machine, an implement of the work machine, and a support structure associated with the work machine.

* * * * *